United States Patent [19]

Henk

[11] Patent Number: 4,563,518

[45] Date of Patent: Jan. 7, 1986

[54] FIBRE-REACTIVE FLUOROTHRIAZINE-GROUP-CONTAINING AZO DYESTUFFS

[75] Inventor: Hermann Henk, Cologne, Fed. Rep. of Germany

[73] Assignee: Bayer Aktiengesellschaft, Leverkusen, Fed. Rep. of Germany

[21] Appl. No.: 198,747

[22] Filed: Oct. 20, 1980

[30] Foreign Application Priority Data

Nov. 8, 1979 [DE] Fed. Rep. of Germany ....... 2945058

[51] Int. Cl.[4] .................... C09B 62/085; D06P 1/382; D06P 3/10; D06P 3/66
[52] U.S. Cl. .................................... 534/638; 534/845; 534/875; 534/876
[58] Field of Search .......................... 260/153, 146 T; 534/638

[56] References Cited

U.S. PATENT DOCUMENTS

| | | | |
|---|---|---|---|
| 2,945,022 | 7/1960 | Fasciati et al. | 260/153 |
| 3,170,911 | 2/1965 | Benz et al. | 260/153 |
| 3,438,962 | 4/1969 | Riat et al. | 260/153 |
| 4,115,378 | 9/1978 | Bien et al. | 260/146 T |
| 4,129,736 | 12/1978 | Begrich | 260/153 X |

Primary Examiner—Floyd D. Higel
Attorney, Agent, or Firm—Sprung Horn Kramer & Woods

[57] ABSTRACT

The invention relates to fibre-reactive monoazo dyestuffs of the general formula

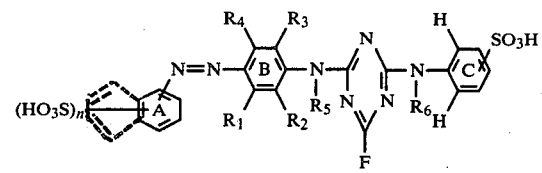

wherein $R_1$, $R_2$, $R_3$, $R_4$, $R_5$ and $R_6$ and n have the meaning given in the text of the application, and also relates to a process for the preparation of these dyestuffs and their use for dyeing and printing materials containing hydroxyl groups or amide groups, such as wool and cotton.

5 Claims, No Drawings

FIBRE-REACTIVE FLUOROTHRIAZINE-GROUP-CONTAINING AZO DYESTUFFS

The invention relates to fibre-reactive monoazo dyestuffs of the general formula (1)

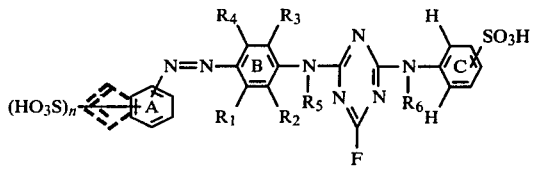
(1)

wherein
$R_1$, $R_2$, $R_3$ and $R_4$ independently of one another denote hydrogen or a low-molecular alkyl or alkoxy group,
$R_5$ and $R_6$ independently of one another denote hydrogen or an optionally substituted low-molecular alkyl group and n is 1, 2 or 3,
and wherein the benzene and naphthalene rings A and C can carry other substituents in addition to the sulphonic acid groups.

If A is a phenyl radical, it can carry one or two sulphonic acid groups and can be substituted, for example, by $C_1$–$C_4$-alkyl, $C_1$–$C_4$-alkoxy, halogen, in particular chlorine, hydroxyl, $C_1$–$C_4$-alkylcarbonylamino or benzoylamino groups and/or carboxyl.

Dyestuffs of the general formula (1) in which A is sulphophenyl, in particular 3- or 4-sulphophenyl, are preferred.

If A is a naphthalene radical, it can carry the azo bridge in the 1-position or 2-position and can be substituted by one to three sulphonic acid groups.

Dyestuffs of the general formula (1) in which A is disulphonaphth-2-yl are preferred.

Dyestuffs of the general formula (1) in which B is a phenylene radical which is linked in the 1,4-position and in which 1 or 2 of the radicals $R_1$, $R_2$, $R_3$ and $R_4$ represents a $C_1$–$C_4$-alkyl and/or -alkoxy radical, in particular methyl and/or methoxy, and the remainder of these radicals represent hydrogen, and especially dyestuffs in which B denotes

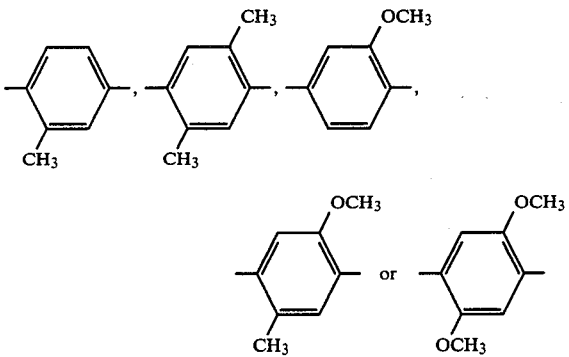

are preferred.

Finally, quite generally, preferred dyestuffs are those in which $R_5$ and $R_6$ are hydrogen, and those in which C is a 3- and/or 4-sulphophenyl radical, which can optionally be substituted by carboxyl, hydroxyl or $C_1$–$C_4$-alkyl, $C_1$–$C_4$-alkoxy, $C_1$–$C_4$-alkyl- or aryl-amino, halogen, in particular chlorine, $C_1$–$C_4$-alkylcarbonylamino, benzoylamino or oxalylamino groups.

The fibre-reactive dyestuffs according to the invention are prepared by reacting a monoazo dyestuff containing amino groups, of the general formula (2)

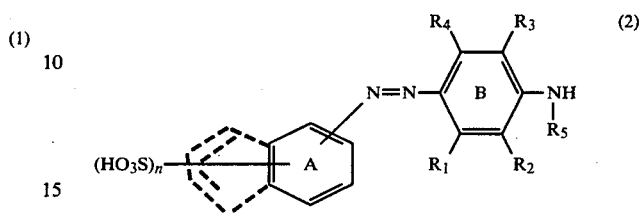
(2)

wherein
$R_1$, $R_2$, $R_3$, $R_4$, $R_5$, A and B have the above-mentioned meaning, and an optionally substituted 3- and/or 4-aminobenzenesulphonic acid (3)

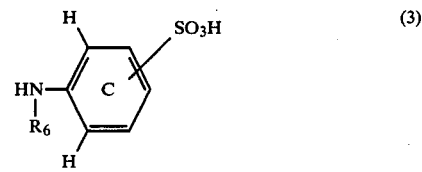
(3)

wherein
$R_6$ and C have the abovementioned meaning, with 2,4,6-trifluoro-1,3,5-triazine in any desired sequence.

A large number of suitable monoazo dyestuffs (2) containing amino groups are described in the literature.

Suitable aminobenzenesulphonic acids (3) which may be mentioned are: 3-aminobenzenesulphonic acid, 4-aminobenzenesulphonic acid, 5-amino-2-chlorobenzenesulphonic acid, 5-amino-2-(phenylamino)-benzenesulphonic acid, 5-amino-2-oxalylamino-benzenesulphonic acid, 5-amino-2-methyl-benzenesulphonic acid and 4-amino-2-methyl-benzenesulphonic acid.

The dyestuffs according to the invention and the dyestuff intermediate products are preferably prepared in aqueous solution. The reactions with 2,4,6-trifluoro-1,3,5-triazine are carried out at a weakly acid to weakly alkaline pH value and at low temperature. The hydrofluoric acid liberated during the condensation is neutralised by adding dilute alkali metal hydroxide, carbonate or bicarbonate solution.

The monofluorotriazine dyestuffs according to the invention are suitable for dyeing and printing various materials such as, for example, wool, polyamide and leather, but especially cellulose-containing materials, such as linen, viscose staple and regenerated cellulose, and above all cotton.

The formulae given are those of the free acids. The dyestuffs are in general employed in the form of their salts. Suitable salts are, in particular, the alkali metal salts (Li, Na and K salts) or the ammonium salts.

EXAMPLE 1

27.5 parts of 3-aminobenzenesulphonic acid are dissolved, at a neutral pH value, in 300 parts of water. 13.5 parts by volume of 2,4,6-trifluoro-1,3,5-triazine are added rapidly at 0° C., whilst stirring vigorously. A pH value of 3–4.5 is maintained by simultaneously adding aqueous sodium carbonate solution.

The reaction ends rapidly, and the condensation product is obtained in the form of a suspension.

A neutral solution of about 750 parts of water and 45 parts of the aminoazo dyestuff prepared by coupling diazotised 3-aminobenzenesulphonic acid with o-anisidine-N-formic acid and subsequent saponification is slowly poured into this suspension. The temperature rises to 10°–20° C. A pH value of 6–7 is maintained with aqueous sodium carbonate solution.

The reaction can be followed by chromatography, and when it has ended the dyestuff is isolated by adding salt. After drying and grinding, a yellow dyestuff powder which dyes cotton, from an aqueous liquor, in fast greenish-tinged yellow shades is obtained. In the form of the free acid, the dyestuff corresponds to the formula

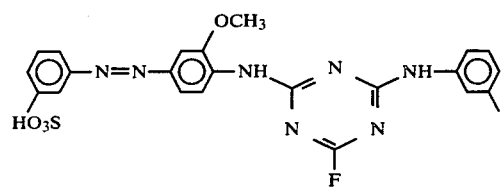

EXAMPLE 2

If, in Example 1, the 3-aminobenzenesulphonic acid on the fluorotriazine is replaced by an equimolar amount of 4-aminobenzenesulphonic acid or of a mixture of the two acids, fast greenish-tinged yellow reactive dyestuffs are likewise obtained.

If the aminoazo dyestuff from Examples 1 and 2 is replaced by an equivalent amount of one of the aminoazo dyestuffs (formula 2) given in the table below and the procedure followed is as described in Examples 1 and 2, other valuable dyestuffs which dye cotton in the shades indicated are obtained.

| Example | Aminoazo dyestuff (2) | Shade on cotton |
|---|---|---|
| 3 | HO₃S–⌬–N=N–⌬(OCH₃)(CH₃)–NH₂ | yellow |
| 4 | (SO₃H)(SO₃H)-naphthyl–N=N–⌬(CH₃)–NH₂ | yellow |
| 5 | (SO₃H)(HO₃S)-naphthyl–N=N–⌬(CH₃)–NH₂ | yellow |
| 6 | (SO₃H)(SO₃H)-naphthyl–N=N–⌬(CH₃)(CH₃)–NH₂ | yellow |
| 7 | HO₃S–⌬–N=N–⌬–NH₂ | greenish-tinged yellow |
| 8 | (SO₃)(SO₃H)-naphthyl–N=N–⌬(OCH₃)(CH₃)–NH₂ | reddish-tinged yellow |
| 9 | (SO₃H)(HO₃S)-naphthyl–N=N–⌬(OCH₃)(CH₃)–NH₂ | reddish-tinged yellow |
| 10 | (SO₃H)(HO₃S)-naphthyl–N=N–⌬(OCH₃)(CH₃O)–NH₂ | reddish-tinged yellow |

I claim:
1. A fibre reactive monoazo dyestuff of the formula

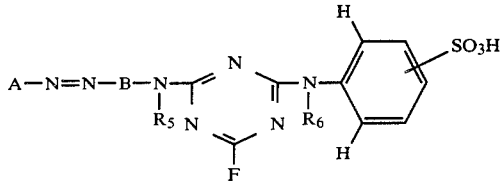

wherein
A is 3- or 4-sulphophenyl or naphthyl substituted by one to three sulphonic acid groups
B is phenylene which is unsubstituted or substituted by low molecular alkyl or alkoxy, and $R_5$ and $R_6$ are each hydrogen or low-molecular alkyl.
2. A dyestuff according to claim 1, wherein A is 1- or 2-naphthyl which contains 1 to 3 sulphonic acid groups.
3. A dyestuff according to claim 1, wherein A is a disulphonaphth-2-yl radical.
4. A dyestuff according to claim 1, and in which 1 or 2 of the radicals $R_1$, $R_2$, $R_3$ and $R_4$ represent $C_1$–$C_4$-alkyl and/or -alkoxy, and the remainder represent hydrogen.
5. A dyestuff according to claim 1, wherein $R_5$ and $R_6$ are hydrogen.

* * * * *